United States Patent
Merklin et al.

(10) Patent No.: US 12,231,554 B2
(45) Date of Patent: Feb. 18, 2025

(54) METHOD FOR CONNECTING A FIELD DEVICE TO A CLOUD

(71) Applicant: Endress+Hauser Process Solutions AG, Reinach (CH)

(72) Inventors: Simon Merklin, Bahlingen (DE); Axel Pöschmann, Basel (CH)

(73) Assignee: Endress+Hauser Process Solutions AG, Reinach (CH)

( * ) Notice: Subject to any disclaimer, the term of this patent is extended or adjusted under 35 U.S.C. 154(b) by 316 days.

(21) Appl. No.: 17/995,430

(22) PCT Filed: Mar. 23, 2021

(86) PCT No.: PCT/EP2021/057448
§ 371 (c)(1),
(2) Date: Oct. 4, 2022

(87) PCT Pub. No.: WO2021/204533
PCT Pub. Date: Oct. 14, 2021

(65) Prior Publication Data
US 2023/0171094 A1 Jun. 1, 2023

(30) Foreign Application Priority Data

Apr. 7, 2020 (DE) ...................... 10 2020 109 696.8

(51) Int. Cl.
*H04L 9/08* (2006.01)
*G05B 19/042* (2006.01)
*H04L 9/32* (2006.01)

(52) U.S. Cl.
CPC ........ *H04L 9/0861* (2013.01); *G05B 19/0425* (2013.01); *H04L 9/0825* (2013.01); *H04L 9/3247* (2013.01); *G05B 2219/25428* (2013.01)

(58) Field of Classification Search
CPC ................ H04L 9/0861; H04L 9/0825; H04L 9/3247; G05B 19/0425; G05B 2219/25428; G08C 19/02
See application file for complete search history.

(56) References Cited

U.S. PATENT DOCUMENTS 7,224,787 B1 * 5/2007 Smith ................... H04M 3/305
379/201.12
8,612,276 B1 * 12/2013 Nielsen .......... G06Q 10/063118
705/7.22

(Continued)

FOREIGN PATENT DOCUMENTS

| DE | 102012107673 A1 | 5/2014 |
|---|---|---|
| DE | 102014117894 A1 | 6/2016 |
| DE | 102016124146 A1 | 6/2018 |

*Primary Examiner* — Aravind K Moorthy
(74) *Attorney, Agent, or Firm* — Kelly J. Smith; Endress+Hauser (USA) Holding, Inc.

(57) ABSTRACT

A method for connecting a field device to a first cloud based service platform includes reading-out a first ticket from the field device using the first service device, wherein the first ticket includes at least one piece of information identifying the field device. The first ticket is transmitted to a second cloud based service platform from the first service device. The method also includes mutual associating and verifying of the first ticket and a second ticket produced at the manufacturer and stored in the second service platform. In the case of successful verifying, the connecting information for the first cloud based service platform is transmitted from the second cloud based service platform to the first service device. A communication connection between the first service device and the first cloud based service platform is established based on the connecting information transmitted from the second service platform.

16 Claims, 1 Drawing Sheet

(56) References Cited

U.S. PATENT DOCUMENTS

| | | | |
|---|---|---|---|
| 9,270,653 B2* | 2/2016 | Maria | H04L 63/062 |
| 9,342,979 B2* | 5/2016 | Fink | G08C 17/02 |
| 9,699,270 B2* | 7/2017 | Kande | H04L 67/125 |
| 9,749,039 B1* | 8/2017 | Chen | H04B 10/073 |
| 9,781,603 B1* | 10/2017 | Nenov | G08B 13/08 |
| 10,057,243 B1* | 8/2018 | Kumar | H04L 9/0891 |
| 10,079,736 B2* | 9/2018 | Bellini, III | H04L 51/00 |
| 10,140,785 B1* | 11/2018 | Cox | G01F 23/80 |
| 10,681,547 B1* | 6/2020 | Yang | H04L 63/0263 |
| 10,810,525 B1* | 10/2020 | Cruickshank, III | G06Q 10/063116 |
| 10,880,691 B1* | 12/2020 | Devine | H04W 4/029 |
| 10,915,081 B1* | 2/2021 | Nixon | H04W 84/18 |
| 11,284,258 B1* | 3/2022 | Wei | H04L 63/10 |
| 11,435,712 B2* | 9/2022 | Pöschmann | G05B 19/0423 |
| 2004/0151290 A1* | 8/2004 | Magarasevic | H04L 63/02 348/E7.078 |
| 2005/0108566 A1* | 5/2005 | Minogue | G06F 21/10 726/4 |
| 2007/0266310 A1* | 11/2007 | Sasaki | G06F 3/002 709/203 |
| 2008/0077697 A1* | 3/2008 | Chu | H04L 63/10 709/229 |
| 2009/0048853 A1* | 2/2009 | Hall | G06Q 10/06 705/305 |
| 2012/0062390 A1* | 3/2012 | Solomon | H04Q 9/00 340/870.03 |
| 2012/0072769 A1* | 3/2012 | Goldszmidt | G06F 11/0793 714/E11.178 |
| 2012/0259540 A1* | 10/2012 | Kishore | G06Q 10/06 705/7.14 |
| 2013/0159039 A1* | 6/2013 | Brech | G06Q 10/06 705/7.15 |
| 2013/0212129 A1* | 8/2013 | Lawson | G05B 11/01 707/779 |
| 2013/0212214 A1* | 8/2013 | Lawson | H04L 67/12 709/217 |
| 2014/0089501 A1* | 3/2014 | Hoferlin | H04L 67/52 709/224 |
| 2014/0122855 A1* | 5/2014 | Maneval | G05B 19/0426 713/1 |
| 2014/0123180 A1* | 5/2014 | Xiao | H04N 21/64753 725/37 |
| 2014/0129270 A1* | 5/2014 | Park | G06Q 10/087 705/7.12 |
| 2014/0172121 A1* | 6/2014 | Li | H04W 4/029 700/12 |
| 2014/0364963 A1* | 12/2014 | Lovell | G05B 15/02 700/2 |
| 2015/0012148 A1* | 1/2015 | Bhageria, Jr. | H04W 4/021 700/295 |
| 2015/0046125 A1* | 2/2015 | Jagiella | G01M 99/008 702/184 |
| 2015/0046697 A1* | 2/2015 | Galpin | H04L 9/3247 713/155 |
| 2015/0113180 A1* | 4/2015 | Baret | G05B 19/042 710/36 |
| 2016/0050128 A1* | 2/2016 | Schaible | H04L 67/565 709/218 |
| 2016/0125331 A1* | 5/2016 | Vollmar | G06Q 10/063114 705/7.13 |
| 2016/0182170 A1* | 6/2016 | Daoura | H04W 12/033 455/3.01 |
| 2016/0299478 A1* | 10/2016 | Junk | G05B 15/02 |
| 2017/0147807 A1* | 5/2017 | Rooyakkers | G05B 19/0425 |
| 2017/0257782 A1* | 9/2017 | Pathare | H04W 24/10 |
| 2017/0269565 A1* | 9/2017 | Mudireddy | G05B 19/042 |
| 2017/0357235 A1* | 12/2017 | Mayer | H04L 67/12 |
| 2018/0010986 A1* | 1/2018 | Matsuo | G06Q 30/016 |
| 2018/0025304 A1* | 1/2018 | Fisher | G06Q 10/06313 726/4 |
| 2018/0039795 A1* | 2/2018 | Gulati | H04L 63/0823 |
| 2018/0046162 A1* | 2/2018 | Palatini | G06F 21/44 |
| 2018/0060594 A1* | 3/2018 | Adler | H04L 63/10 |
| 2018/0151004 A1* | 5/2018 | Gintz | G07C 5/085 |
| 2018/0164778 A1* | 6/2018 | Gunzert | G05B 19/41855 |
| 2018/0204165 A1* | 7/2018 | Yokota | G06Q 10/06316 |
| 2018/0227214 A1 | 8/2018 | Huang et al. | |
| 2018/0234249 A1* | 8/2018 | Haase | H04L 63/0442 |
| 2019/0042819 A1* | 2/2019 | Agarwal | G05B 19/41835 |
| 2019/0098035 A1* | 3/2019 | Periaswamy | G05B 19/0428 |
| 2019/0116179 A1* | 4/2019 | Xu | H04L 9/3226 |
| 2019/0146447 A1* | 5/2019 | Albert | G05B 19/4185 700/108 |
| 2019/0163912 A1* | 5/2019 | Kumar | H04L 9/3263 |
| 2019/0245861 A1* | 8/2019 | Haase | H04L 63/108 |
| 2019/0271681 A1* | 9/2019 | McKirdy | G06K 19/0723 |
| 2019/0332388 A1 | 10/2019 | Schmidt et al. | |
| 2019/0379535 A1 | 12/2019 | Fengler | |
| 2020/0034261 A1* | 1/2020 | Yokota | G05B 23/0235 |
| 2020/0048069 A1* | 2/2020 | Paar | B67D 7/303 |
| 2020/0104108 A1* | 4/2020 | Kempf | G06F 8/61 |
| 2020/0111271 A1* | 4/2020 | Anderson | F01N 3/2066 |
| 2020/0201296 A1* | 6/2020 | Mayer | H04L 12/40006 |
| 2020/0204631 A1* | 6/2020 | Subramaniam | H04L 67/141 |
| 2020/0228316 A1* | 7/2020 | Cahill | H04L 9/3297 |
| 2020/0233870 A1* | 7/2020 | Goyal | G06F 16/2282 |
| 2020/0240712 A1* | 7/2020 | Teng | F27D 19/00 |
| 2020/0252207 A1* | 8/2020 | Hanel | H04L 9/083 |
| 2020/0293646 A1* | 9/2020 | Rooyakkers | H04L 63/0823 |
| 2020/0356082 A1* | 11/2020 | Wang | G06Q 10/063 |
| 2020/0358738 A1* | 11/2020 | Mircescu | H04L 63/0272 |
| 2020/0412758 A1* | 12/2020 | Trivellato | G06F 21/577 |
| 2021/0116262 A1* | 4/2021 | Gupta | G06Q 10/00 |
| 2021/0165376 A1* | 6/2021 | Haag | G01F 23/296 |
| 2021/0173355 A1* | 6/2021 | Tang | G05B 23/0232 |
| 2021/0181720 A1* | 6/2021 | Ratilla | G05B 19/4185 |
| 2021/0243035 A1* | 8/2021 | Ruane | H04L 9/0897 |
| 2021/0248569 A1* | 8/2021 | Moyal | G06F 11/3006 |

* cited by examiner

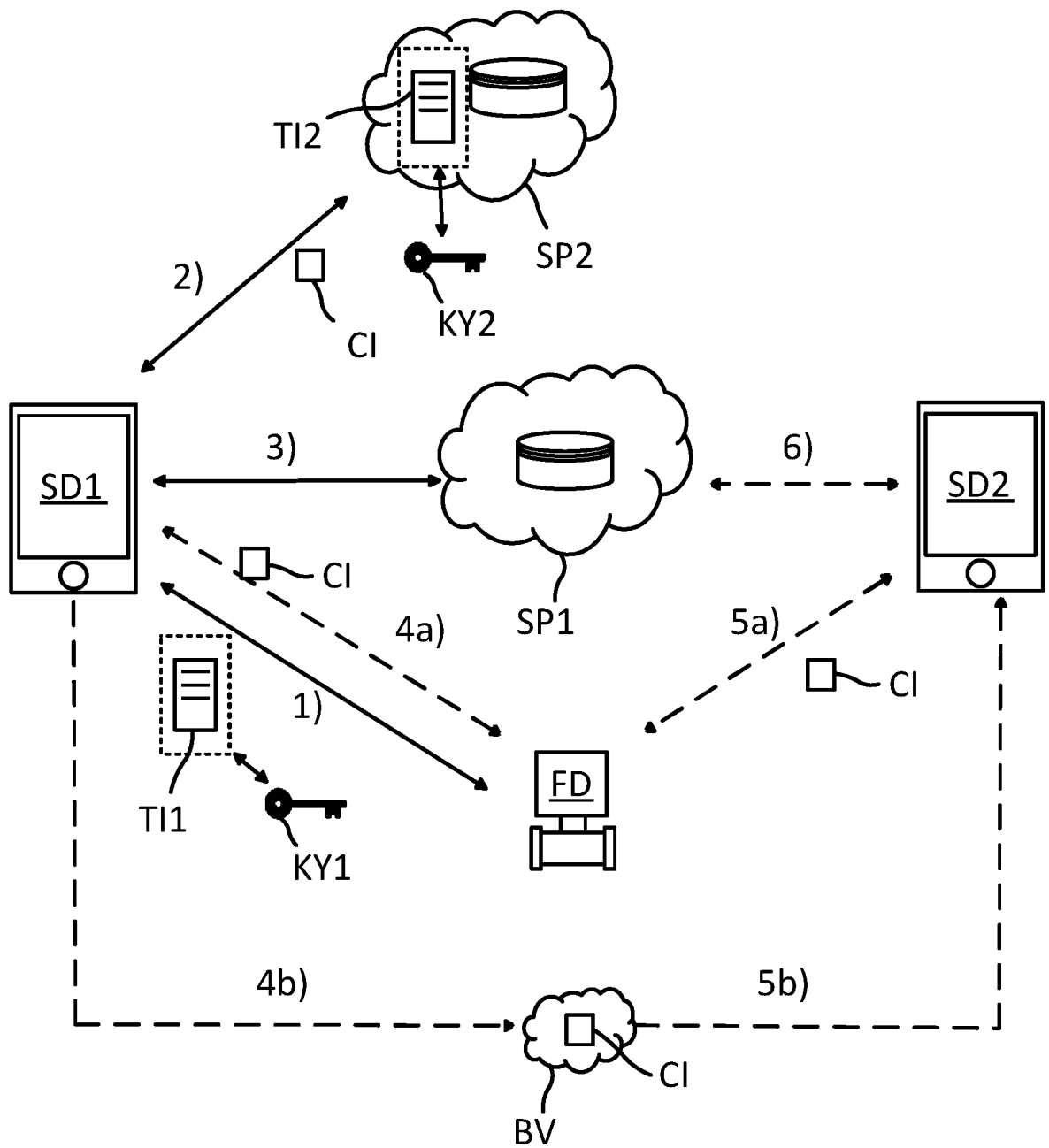

METHOD FOR CONNECTING A FIELD DEVICE TO A CLOUD

CROSS-REFERENCE TO RELATED APPLICATIONS

The present application is related to and claims the priority benefit of DPMA Patent Application No. 10 2020 109 696.8, filed on Apr. 7, 2020, and International Patent Application No. PCT/EP2021/057448, filed Mar. 23, 2021, the entire contents of which are incorporated herein by reference.

TECHNICAL FIELD

The invention relates to a method for connecting a field device of automation technology to a first cloud based service platform.

BACKGROUND

Known from the state of the art are field devices, which are used in industrial plants. In process automation technology, as well as in manufacturing automation technology, field devices are often applied. Referred to as field devices are, in principle, all devices, which are applied near to a process and which deliver, or process, process relevant information. Field devices are used for registering and/or influencing process variables. Serving for registering process variables are measuring devices, or sensors. Such are used, for example, for pressure- and temperature measurement, conductivity measurement, flow measurement, pH measurement, fill level measurement, etc., and register the corresponding process variables, pressure, temperature, conductivity, pH value, fill level, flow, etc. Used for influencing process variables are actuators. Such are, for example, pumps or valves, which can influence the flow of a liquid in a measuring tube or pipe or the fill level in a containment. Besides the above mentioned measuring devices and actuators, referred to as field devices are also remote I/Os, radio adapters, and, in general, devices, which are arranged at the field level.

A large number of such field devices are produced and sold by the Endress+Hauser group of companies.

In modern industrial plants, field devices are, as a rule, connected with superordinated units via communication networks, such as, for example, fieldbusses (Profibus®, Foundation® Fieldbus, HART®, etc.). Normally, the superordinated units are control systems, or control units, such as, for example, a PLC (programmable logic controller). The superordinated units serve, among other things, for process control, process visualizing, process monitoring as well as for commissioning field devices. The measured values registered by field devices, especially by their sensors, are transmitted via the bus system to one or more superordinated units. In addition, also a data transmission from the superordinated unit via the bus system to the field devices is required, especially for configuration and parametering of field devices as well as for operation of actuators.

Today, there is the need to make the data of field devices also available at central sites via the Internet (for example, with cloud based service platforms or cloud based databases), for example, in conjunction with IIoT ("Industrial Internet of Things") or Industry 4.0. For this, different options for data transmission are available: For example, the data of the field devices transmitted via the communication networks can be monitored at an edge device and, for example, transmitted via a mobile radio network to the desired central site. Alternatively, the field devices can have a suitable communication interface (for example, a radio module, especially using UMTS, LTE or 5G), via which they transmit the data independently to the desired central site.

Moreover, there is the option that a user registers data of the field device by means of a service device and then transmits such by the service device to the central site. For example, this is useful, when the field device has no suitable communication interface, but, instead, only a communication interface for local data transmission (for example, via Bluetooth). This is the usual case for currently available field devices.

In order to be able to transmit the data by means of the service device to the central site, a communication channel between service device and central site must be created. For this, the operator must frequently independently input the connecting parameters, such as address, etc., and provide the authentication. Such can be a time consuming process.

Known from the state of the art are methods, by means of which IoT ("Internet of Things") devices can independently connect with a central site, without requiring that the user must input anything for this (so-called "zero-touch provisioning"). An example is the "secure device onboarding" (SDO) method of Intel (see, for example, https://software-.intel.com/en-us/secure-device-onboard). In such case, a central SDO-service undertakes responsibility for associating operator and device at start-up of the device. Proviso for such method is an IoT device with durable connection to the Internet and a known SDO endpoint as central site (for example, with Intel as operator).

A disadvantage of the SDO method is that the method does not function for devices, which do not have their own Internet access. Therefore, it is not suitable for most currently available field devices. Another disadvantage is that the address of the central site of the customer must be known at the production of the device and correspondingly stored in the device. However, such is sometimes not known at the production of the device, since it is customer specific. A subsequent changing of the central site of the customer stored in the device, as needed by the SDO-service for the connecting, would, however, represent an undesired configuration in the device.

SUMMARY

An object of the invention is to provide a method, which allows an easy initial connecting of a field device of automation technology to a cloud based service platform, wherein the field device does not have its own Internet access.

The object is achieved by a method for connecting a field device of automation technology to a first cloud based service platform, comprising:
  establishing a communication connection between a first service device and the field device;
  reading-out a first ticket from the field device by means of the first service device via the established communication connection between the first service device and the field device, wherein the first ticket includes as content at least one piece of information unequivocally identifying the field device;
  establishing a communication connection between a first service device and a second cloud based service platform, wherein the second service platform includes a second ticket, wherein the second ticket includes as content at least customer data and connecting information for the first cloud based service platform;

transmitting the first ticket to the second cloud based service platform from the first service device via the established communication connection between the first service device and the second cloud based service platform;

mutual associating of the first ticket and the second ticket based on their contents and verifying the first and second tickets;

in the case of successful verifying, transmitting the connecting information for the first cloud based service platform from the second cloud based service platform to the first service device via the established communication connection between the first service device and the second cloud based service platform; and establishing a communication connection between the first service device and the first cloud based service platform based on the connecting information transmitted from the second service platform.

The method of the invention permits registering a field device with a first cloud based service platform, without requiring that the customer has to input anything extra. For this, a ticket pair is earlier produced. The first ticket is especially stored in the course of production of the field device. The second ticket is especially created at the ordering of the field device by the customer. For this, the customer provides at the ordering information concerning a selected cloud based service platform, to which the data of its ordered field device is to be transmitted.

Only by the interaction of the two tickets is the first service device told the connection information, which it requires, in order to be able to produce a communication connection with the first service platform.

Field devices described in connection with the method of the invention have already been mentioned, by way of example, above in the introductory part of the description.

The terminology "cloud based" in connection with the invention refers to a service platform implemented in a server and contactable via the Internet. A database can be implemented in the service platform, and applications called for accessing the data of the database and for processing and making use of such. These applications can be run by the user via a web interface.

In an advantageous embodiment, the method of the invention supplementally includes method steps as follows:
 transmitting data of the field device, especially diagnostic data, condition data and/or measured values of physical variables of a process, in which a product is made from a raw or starting material by the application of chemical, physical or biological procedures, to the first service device via the communication connection established between the first service device and the field device;
 transmitting the data of the field device from the first service device to the first cloud based service platform via the communication connection established between the first service device and the first cloud based service platform.

Because a communication connection between the first service device and the first cloud based service platform has been established, such can be used to transmit the data retrieved from the field device. The type of data transmitted from the field device has not been stated exclusively. Thus, any other types of data can be transmitted from the field device.

In an advantageous embodiment of the method of the invention, it is provided that the connecting information for the first cloud based service platform is transmitted to the field device via the communication connection established between the first service device and the field device and stored in the field device. Since the field device has usually already been produced before the ordering by the customer, the connection information cannot be stored earlier in the field device. This method step allows storing the connecting information in the field device after start-up of the field device, or after initial connecting to the first service platform.

In a first advantageous variant of the method of the invention, it is provided that the method supplementally comprises steps as follows:
 establishing a communication connection between a second service device and the field device;
 transmitting the stored connecting information for the first cloud based service platform from the field device to the second service device via the communication connection established between the second service device and the field device;
 establishing a communication connection between the second service device and the first cloud based service platform based on the connecting information transmitted from the field device.

The connection information subsequently stored in the field device can thus be utilized, in order, in simple manner, to enable the connecting of an additional service device to the first service platform. For this, the second service device does not have to still be connected with the second service platform, whereby time can be saved.

In an advantageous, additional development of the method of the invention, it is provided that the first service device has an application for controlling the method steps initiated from the first service device with an online user administration, wherein user authenticates with the application before performance of the method and wherein the connecting information for the first cloud based service platform is stored associated with the user in the online user administration.

The online user administration is, in such case, either integrated in the second cloud based service platform or implemented in any additional server independent of the second cloud based service platform. The user authenticates, for example, by means of inputting a username and password, by registering at least one biometric property of the user via the first service device or some similar authentication method.

The online user administration serves for storing rights of the operator, thus, for example, with which field devices it has access to the cloud based service platform via the application.

In a second advantageous variant of the method of the invention, it is provided that the method supplementally comprises method steps as follows:
 providing a second service device, which executes the application;
 authenticating the user with the application;
 establishing a communication connection between the second service device and the field device;
 providing the connecting information for the first cloud based service platform to the second service device by the online user administration; and establishing a communication connection between the second service device and the first cloud based service platform based on the provided connecting information.

The application can be called in a plurality of service devices. By authentication of the user, such as above described, the same access rights to field devices and service platforms hold on all service devices of the user.

An advantageous embodiment of the first or the second variant of the method of the invention includes additional method steps as follows:

transmitting data of the field device, especially diagnostic data, condition data and/or measured values of physical variables of a process, in which a product is made from a raw or starting material by the application of chemical, physical or biological procedures, to the second service device via the communication connection established between the second service device and the field device; and transmitting the data of the field device from the second service device to the first cloud based service platform via the communication connection established between the second service device and the first cloud based service platform.

Independently of the manner, in which the second service device connects with the first cloud based service platform and establishes a communication connection with such, the second service device can then likewise transmit the data of the field device to the first service platform. Of course, in principle, any number of other service devices can be "coupled" with the first service platform, in order to transmit data of the field device to the first service platform.

In an advantageous, additional development of the method of the invention, it is provided that a key pair is created at the manufacturer during the production of the field device, wherein a private key as a component of the key pair is written to the field device during the manufacture, and wherein the first ticket is signed by means of the private key. The private key is, in such case, only known to the first field device and durably written into it, thus, is unchangeable, and not capable of being read out by a user.

In an advantageous embodiment of the method of the invention, it is provided that the second ticket is created at the manufacturer at the ordering of the field device, and wherein the second ticket is signed by means of a public key as a component of the key pair. The public keys of different field devices can, for this, be stored in a central key directory, each associated with the identification information of its particular field device. In the course of ordering a field device—and, associated therewith, creating its second ticket—the corresponding public key is retrieved and used, in order to sign the second ticket.

In an advantageous embodiment of the method of the invention, it is provided that, in the course of the verifying, a mutual checking of the signatures of the first and second tickets occurs, and wherein the verification is only successful, when the signatures are, in each case, checked successfully. Only, in such case, do the two tickets go together and the user really owns the field device.

In an advantageous embodiment of the method of the invention, it is provided that the first service device, and the second service device, must successfully authenticate with the field device in the course of establishing the communication connection between the first service device and the field device, and in the course of establishing the communication connection between the second service device and the field device. This occurs, for example, as a result of input of an authentication feature (for example, a code composed of a username and password and/or by registering a biometric feature) into the corresponding service device, or by means of the corresponding service device. The field device examines the authentication feature and approves, or blocks, the access correspondingly.

In an advantageous embodiment of the method of the invention, it is provided that at least the first service device or the second service device is connected with the field device via a radio connection or a wire connection. In such case, it is, for example, a Bluetooth connection or a WiFi/WLAN connection. The field device and the corresponding service devices have appropriate communication interfaces for this.

In an advantageous embodiment of the method of the invention, it is provided that the first service device and the second service device establish their communication connections to the first cloud based service platform and/or the second cloud based service platform via the Internet. The service devices include for this at least one communication interface, in order to transmit the data. For example, a mobile data connection (UMTS, LTE, 5G) or a WiFi/WLAN connection is used.

In an advantageous embodiment of the method of the invention, it is provided that used as a first service device, or as a second service device, is a mobile end device, especially a smart phone or tablet, or a computer unit, especially a laptop. The service devices can, for example, also be Field Xpert tablets produced and sold by the applicant.

Furthermore, the object is achieved by a service device having a software application for performing the method of the invention. The service device can, in such case, be the first service device and/or the second service device. In the case, in which the service device is a computer unit, the software application is a software application in the computer unit

BRIEF DESCRIPTION OF THE DRAWINGS

The invention will now be explained in greater detail based on the appended drawing. The sole FIGURE of the drawing shows as follows:

FIG. 1 shows an example of an embodiment of the method of the present disclosure.

DETAILED DESCRIPTION

FIG. 1 shows a field device FD, for example a measuring device for registering flow velocity of a fluid medium in a pipeline. The method of the invention is, however, usable for any type of field device. Thus, the field device FD can be, such as in the present case, a measuring device for registering physical, measured variables of a process, in which a product is made from a raw or starting material by the application of chemical, physical or biological procedures, or an actuator for influencing physical, measured variables of a process, in which a product is made from a raw or starting material by the application of chemical, physical or biological procedures. Alternatively, the field device FD can be a field—, or process near data processing—or network device, for example, a control unit, a gateway or a flow computer.

The field device FD is installed at a measuring point (not shown) in a plant and connected with a communication network of the plant. The flow velocity measured values ascertained by the field device FD are transmitted via the communication network to a control unit and from such control unit to the control station of the plant.

The field device FD generates, besides the measured values, other data to be transmitted with the measured values via the Internet to a first cloud based service platform SP1, for example, an asset management system. The field device FD has, however, no Internet access, but, instead, only a radio interface reading-out/transmitting the data, for example, an interface based on Bluetooth LE. It is, consequently, provided to transmit the data to a first service device SD1, which then transmits the data via the Internet to the first cloud based service platform SP1. The first service device SD1 is, in the present example, a smart phone, in which an app (application) is running, by means of which steps of a method (to be described below) are performed.

The method of the invention is performed in order that the user need perform only few steps to load the data of the field device FD from the first service device SD1 into the first cloud based service platform.

In a first method step 1), the user couples the first service device, e.g. a smartphone, by radio with the field device FD and thereby establishes a communication connection. For this, the method is initiated manually in the app of the smartphone. In the course of the coupling, it can be provided that the user authenticates with the field device via the first service device SD1, for example, by inputting a code. Then, the first service device SD1 reads a first ticket TI1 from the field device FD. The first ticket was created during manufacture, signed by means of a private key KY1 accessible only to the field device FD, written into the field device FD and contains identification information of the field device FD, for example, a serial number.

In a second method step 2), the first service device SD1 connects via the Internet with a second cloud based service platform SP2 and thereby establishes a communication connection. It can be provided that the user authenticates with the second cloud based service platform SP2 by means of the first service device SD1. The second cloud based service platform SP2 is especially an order/service platform of the field device manufacturer. The first service device SD1 transmits the first ticket TI1 to the second cloud based service platform SP2. Stored in the second cloud based service platform SP2 is a second ticket TI2, which was created during the ordering of the field device FD and which was signed by means of a public key KY2 corresponding to the private key KY1. The second ticket includes especially customer data and connection information CI for the first cloud based service platform. The connection information CI was entered during the ordering by the customer and contains, for example, the Web address of the first cloud based service platform SP1 and login data.

The second cloud based service platform executes a mutual testing of the signed tickets TI1, TI2. For this, there occurs a testing of the signatures of the tickets with the key KY2, since this can decrypt both signatures. In the case, in which the verifications of tickets TI1, TI2 was successful, the connection information CI is transmitted from the second cloud based service platform SP2 to the first service device SD1.

In a third method step 3), the first service device SD1 connects to the first cloud based service platform SP1 using the connection information CI and thereby establishes a communication connection. The first service device SD1 reads out the data of the field device FD, or the field device FD transmits its data to the first service device SD1. The data are then transmitted from the first service device SD1 to the first cloud based service platform and stored there, thus, stored by such.

The method of the invention offers the user/customer, thus, the opportunity in simple manner to connect its field device FD to the first cloud based service platform, in the sense of "zero touch".

The user/customer can also use other service devices, in order after the first connecting of the field device FD to the first cloud based service platform to transmit data of the field device FD to the first cloud based service platform SP. For this, two alternatives are available:

In the first variant, the first service device SD1 stores in the field device FD in a method step 4a) the connection information CI obtained from the second cloud based service platform SP2. A second service device SD2 can then, in a method step 5a), after authenticating itself with the field device FD, read out the connection information CI from the field device FD.

In the second variant, the application of the first service device utilizes an online user administration UA. Such is either located in the second cloud based service platform SP2 or in an additional service platform. Upon starting the application, the user logs itself into the online user administration UA. Only when it can log in, can it perform the above described method of the invention (thus, perform the initial connecting of the field device FD to the first cloud based service platform SP1).

The first service device SD1 transmits in a method step 4b) the connection information CI obtained from the second cloud based service platform SP2 to the online user administration UA, which then stores the connection information CI.

The user must then, by means of a second service device SD2, in which the application is likewise running, log into the online user administration UA. Then, in a method step 5b), the online user administration UA transmits the connection information CI to the second service device SD2.

After the second service device SD2 has obtained the connection information CI—independently of the variant of the method—such can, analogously to method step 3), establish a communication connection with the first cloud based service platform SP1 and, analogously to method step 3), transmit the data of the field device FD to the first cloud based service platform SP1.

The invention claimed is:

1. A method for connecting a field device of automation technology to a first cloud based service platform, comprising:
   establishing a communication connection between a first service device and the field device;
   reading-out a first ticket from the field device using the first service device via the communication connection between the first service device and the field device, wherein the first ticket includes as content at least one piece of information identifying the field device;
   establishing a communication connection between the first service device and a second cloud based service platform, wherein the second cloud based service platform includes a second ticket, wherein the second ticket includes as content at least customer data and connecting information for the first cloud based service platform;
   transmitting the first ticket to the second cloud based service platform from the first service device via the communication connection between the first service device and the second cloud based service platform;

mutual associating of the first ticket and the second ticket based on their contents;
transmitting the connecting information for the first cloud based service platform from the second cloud based service platform to the first service device via the communication connection between the first service device and the second cloud based service platform; and
establishing a communication connection between the first service device and the first cloud based service platform based on the connecting information transmitted from the second service platform.

2. The method of claim 1, further comprising:
transmitting data of the field device to the first service device via the established communication connection between the first service device and the field device; and
transmitting the data of the field device from the first service device to the first cloud based service platform via the communication connection between the first service device and the first cloud based service platform.

3. The method of claim 2, wherein the data of the field device include diagnostic data, condition data or measured values of physical variables of a process, in which a product is made from a raw or starting material by the application of chemical, physical or biological procedures.

4. The method of claim 1, wherein the connecting information for the first cloud based service platform is transmitted to the field device via the communication connection between the first service device and the field device and stored in the field device.

5. The method of claim 4, further comprising:
establishing a communication connection between a second service device and the field device;
transmitting the stored connecting information for the first cloud based service platform from the field device to the second service device via the established connection between the second service device and the field device; and
establishing a communication connection between the second service device and the first cloud based service platform based on the connecting information transmitted from the field device.

6. The method as claimed in claim 5, further comprising:
transmitting data of the field device to the second service device via the established communication connection between the second service device and the field device; and
transmitting the data of the field device from the second service device to the first cloud based service platform via the communication connection established between the second service device and the first cloud based service platform.

7. The method of claim 5, wherein the first service device and the second service device are both connected with the field device via radio or wire connections.

8. The method of claim 1, wherein the first service device has an application for controlling the method steps initiated from the first service device with an online user administration tool, wherein a user authenticates with the application before performance of the method and wherein the connecting information for the first cloud based service platform is stored associated with the user in the online user administration tool.

9. The method of claim 8, further comprising:
providing a second service device, which executes the application;
authenticating the user with the application;
establishing a communication connection between the second service device and the field device;
providing the connecting information for the first cloud based service platform to the second service device by the online user administration; and
establishing a communication connection between the second service device and the first cloud based service platform based on the connecting information.

10. The method of claim 8, wherein the first service device and the second service device authenticate with the field device when establishing the communication connection between the first service device and field device, and when establishing the communication connection between the second service device and the field device.

11. The method of claim 1, wherein a key pair is created at a manufacturer during production of the field device, wherein a private key as a component of the key pair is written to the field device during the manufacture, and wherein the first ticket is signed by means of the private key.

12. The method of claim 11, wherein the second ticket is created at the manufacturer in response to an ordering of the field device, and wherein the second ticket is signed by means of a public key as a component of the key pair.

13. The method of claim 12, wherein, during verification, a mutual checking of the signatures of the first ticket and the second ticket occurs, and wherein the verifying is only successful when the signatures are each checked successfully.

14. The method of claim 1, wherein the first service device and the second service device establish their communication connections to the first cloud based service platform or to the second cloud based service platform via the Internet.

15. The method of claim 1, wherein each of the first service device and the second service device, are one of a mobile end device.

16. A service device configured to connect a field device of automation technology to a first cloud based service platform, comprising:
establishing a communication connection between a first service device and the field device;
reading-out a first ticket from the field device using the first service device via the communication connection between the first service device and the field device, wherein the first ticket includes as content at least one piece of information identifying the field device;
establishing a communication connection between the first service device and a second cloud based service platform, wherein the second cloud based service platform includes a second ticket, wherein the second ticket includes as content at least customer data and connecting information for the first cloud based service platform;
transmitting the first ticket to the second cloud based service platform from the first service device via the communication connection between the first service device and the second cloud based service platform;
mutual associating of the first ticket and the second ticket based on their contents;
transmitting the connecting information for the first cloud based service platform from the second cloud based service platform to the first service device via the communication connection between the first service device and the second cloud based service platform; and establishing a communication connection between the first service device and the first cloud based service platform based on the connecting information transmitted from the second service platform.

\* \* \* \* \*